April 6, 1943.    B. L. NUNNALLY    2,315,729
COMBINATION PRINTING ROLL AND CORE SUPPORT
Filed Oct. 31, 1941
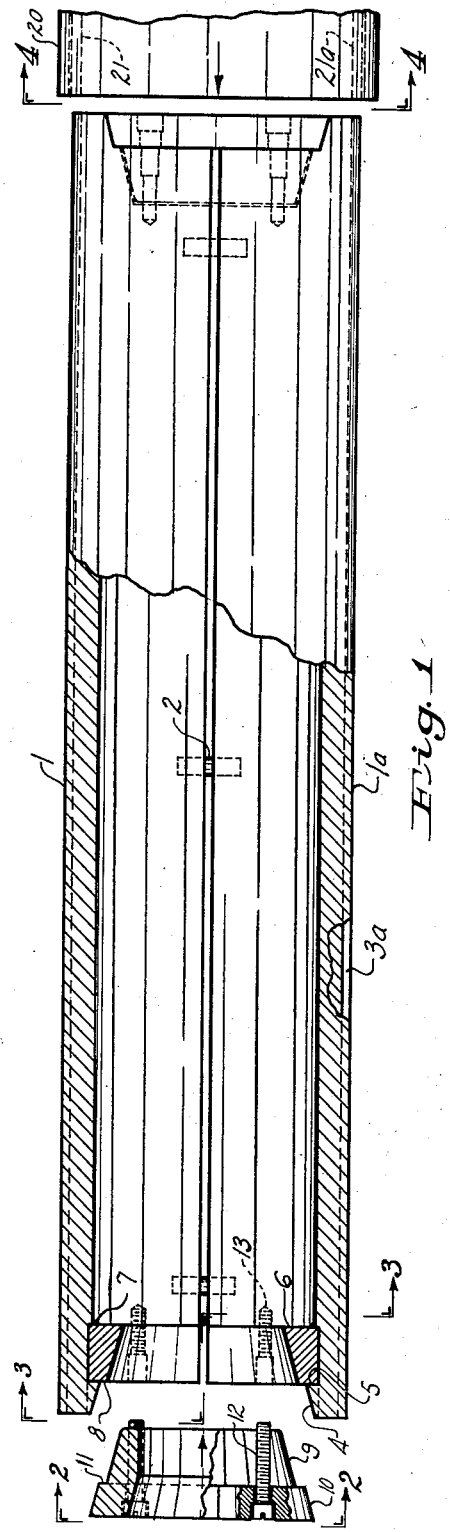
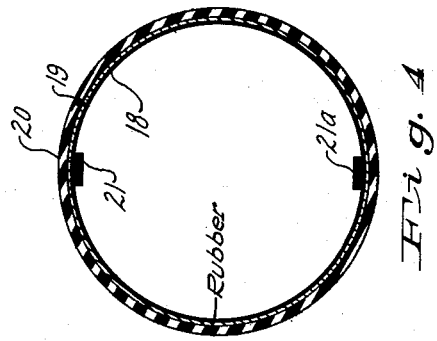
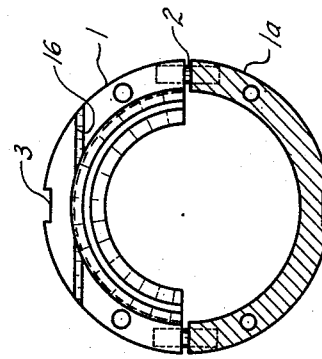
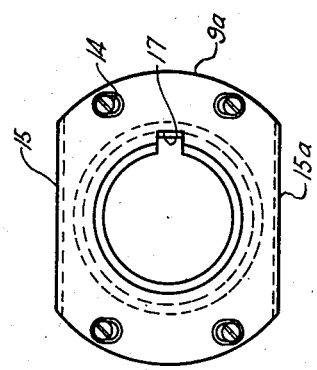
INVENTOR.
Benjamin L. Nunnally
BY William B. Jaspert, Attorney Patented Apr. 6, 1943

2,315,729

UNITED STATES PATENT OFFICE 2,315,729

COMBINATION PRINTING ROLL AND CORE SUPPORT

Benjamin L. Nunnally, Scarsdale, N. Y., assignor to Jas. H. Matthews & Company, Pittsburgh, Pa., a corporation of Pennsylvania Application October 31, 1941, Serial No. 417,325

2 Claims. (Cl. 101—375)

This invention relates to new and useful improvements in collapsible cylinders for rubber printing rolls, and it is among the objects thereof to employ a collapsible core which shall be interchangeable with rubber printing rolls of substantially the same length as the core structure or with a plurality of rubber design sleeves that may be assembled on the core in proper relation to each other.

The invention will become more apparent from a consideration of the accompanying drawing constituting a part hereof in which like reference characters designate like parts and in which:

Fig. 1 is a vertical cross-section partially in side elevation taken longitudinally of a collapsible core showing an end bracket and a fragmentary portion of a printing roll in end alignment for assembly;

Fig. 2 an end elevational view of a head or end bracket for the core, taken along the line 2—2, Fig. 1;

Fig. 3 an end elevational view partially in section of the collapsible core structure taken along the line 3—3, Fig. 1; and Fig. 4 an end elevational view of the rubber sleeve or printing roll taken along the line 4—4, Fig. 1.

In the drawing, the numerals 1 and 1a designate two half sections of a core structure embodying this invention, joined by dowel pins 2 and having key ways or grooves 3 and 3a in transverse alignment, such alignment being maintained by register of the half sections 1 and 1a through dowel pins 2. One end of the dowel pins may be secured to one of the half sections of the core sleeve, and the other end slidingly engaged with the hole in the cooperating sleeve portion.

Each end of the half sections 1, 1a, has a radial flange 4 in back of which is secured a semi-cylindrical head support 6. Support 6 may be secured to half sections 1, 1a, either by welding as shown at 7 or by drive pins (not shown). The outer faces 8 of the head supports 6 form an abutment, and the flange 4 and inner face of the member 6 are of conical shape to receive the complementary shaped faces 9 and 10 of the mandrel heads or end brackets 9a (Fig. 2). A shoulder 11 abuts the shoulder or end face 8 of the supports 6 and the ends of half sections 1, 1a. The heads 9 are secured in the ends of the split mandrel by bolts 12 that extend into tap openings 13 of the half sections 1 and 1a.

By inserting the heads 9a in the ends of the half sections 1, 1a and drawing up the bolts 12, the complementary shaped tapered faces of the heads and head supports will be intimately engaged in sliding contact to expand and secure the mandrel sections at their proper and predeterminable diameter.

As shown in Fig. 2, the bolt holes 14 of the heads are elongated to permit collapsing or expanding of half sections 1, 1a without completely removing bolts 12. Opposite faces 15 and 15a of the mandrel heads 9a are cut off to interact with slotted portions 16 at the ends of the half sections 1 and 1a.

This construction permits the half sections 1, 1a to be collapsed when bolts 12 are loosened without completely disengaging heads 9a. It also permits the printing roll or sleeve to be the same length as half sections 1, 1a and also permits butting two or more printing rolls on the same shaft.

The printing roll is a sleeve 18 of rubber with an intermediate layer of fabric 19 and an outer facing of rubber 20 with the printing matter in or on the face portion thereof. It is provided with keys 21, 21a, that engage slots 3 and 3a. The printing roll is mounted on the core by sliding it over the core from one end to the other as shown in Fig. 1. The printing sleeve or roll is slid on or removed from the core when half sections 1 and 1a are in collapsed position. After assembly, the bolts 12 of heads 9a are screwed in place and heads 9a thus expand the core sections 1 and 1a to intimately engage and securely hold the printing roll sleeve 18.

Instead of a full length sleeve, shorter sections may be assembled on the core, and their printing faces may be maintained in proper register and alignment by means of the lugs or keys 21, 21a.

The hereinabove described collapsible core for use with rubber printing rolls or sleeves provides means for engaging the inner surface of the sleeve in a manner to prevent rotation under printing pressure. It also permits butting designs where two or more are printed at one time on the same shaft. It may also be employed as a collapsible core for use with rubber offset sleeves on lithographic presses in place of the conventional rubber blanket.

Although one embodiment of the invention has been herein illustrated and described, it will be evident to those skilled in the art that various modifications may be made in the details of construction and materials without departing from the principles herein set forth.

I claim:

1. A composite printing roll and core structure comprising a printing sleeve, a collapsible core support therefor, said support consisting of half sections having dowel pins for maintaining said sections in angular and axial alignment, said half sections having slots and said printing sleeves having keys for engagement with the slots of said half sections, core heads for said half sections, said half sections having their ends of conical shape for receiving complementary shaped faces of said heads, means for securing said heads to said half sections, and means in said heads for maintaining a fixed relation of said heads to said core structure.

2. A composite printing roll as set forth in the next preceding claim in which the core heads are provided with shaft key ways and are shaped to maintain fixed alignment of said key ways with the key slots of said core sections.

BENJAMIN L. NUNNALLY.